US 9,501,635 B2

(12) United States Patent
Chinta et al.

(10) Patent No.: US 9,501,635 B2
(45) Date of Patent: Nov. 22, 2016

(54) ISOLATION OF SERVICES OR PROCESSES USING CREDENTIAL MANAGED ACCOUNTS

(75) Inventors: Ramesh Chinta, Sammamish, WA (US); Scott A. Field, Redmond, WA (US); Liqiang Zhu, Redmond, WA (US); Umit Akkus, Bellevue, WA (US); Siddharth Bhai, Redmond, WA (US); Gopinathan Kannan, Redmond, WA (US); James J Simmons, Bothell, WA (US); Qi Cao, Bellevue, WA (US); Paul Miller, Redmond, WA (US); Ryan Fairfax, Redmond, WA (US); Alexandru Hanganu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1621 days.

(21) Appl. No.: 12/146,344

(22) Filed: Jun. 25, 2008

(65) Prior Publication Data
US 2009/0328154 A1    Dec. 31, 2009

(51) Int. Cl.
H04L 29/06    (2006.01)
G06F 21/46    (2013.01)

(52) U.S. Cl.
CPC ..................... *G06F 21/46* (2013.01)

(58) Field of Classification Search
CPC ....................................................... G06F 21/46
USPC ............................................................ 726/4
See application file for complete search history.

(56) References Cited

U.S. PATENT DOCUMENTS

| | | | |
|---|---|---|---|
| 5,032,979 A * | 7/1991 | Hecht et al. | 726/25 |
| 5,918,218 A * | 6/1999 | Harris et al. | 705/37 |
| 6,157,953 A | 12/2000 | Chang et al. | |
| 6,253,193 B1 * | 6/2001 | Ginter et al. | 705/57 |
| 6,272,631 B1 | 8/2001 | Thomlinson et al. | |
| 6,279,111 B1 | 8/2001 | Jensenworth et al. | |
| 6,289,462 B1 | 9/2001 | McNabb et al. | |
| 6,609,115 B1 | 8/2003 | Mehring et al. | |
| 6,618,806 B1 | 9/2003 | Brown et al. | |
| 7,100,195 B1 * | 8/2006 | Underwood | 726/2 |
| 7,103,912 B2 * | 9/2006 | Xia et al. | 726/8 |
| 7,143,066 B2 | 11/2006 | Shear et al. | |
| 7,287,271 B1 | 10/2007 | Riggins | |

(Continued)

OTHER PUBLICATIONS

Microsoft Corp., 'Microsoft SQL Server 2000 system administration', Copyright © 2003 by Microsoft Corporation, http://orlin.hgs.name/MSSQL%202000%20-SQL%20Server%202000%20System%20Administration%20-%20Mcse%20Mcsa%20Mcdba.pdf.*

(Continued)

Primary Examiner — Luu Pham
Assistant Examiner — Ronald Baum
(74) Attorney, Agent, or Firm — Timothy Churna; Judy Yee; Micky Minhas

(57) ABSTRACT

This disclosure describes methods, systems, and application programming interfaces for creating a credential managed account. This disclosure describes creating a new password managed account, defining the password managed account, wherein the password managed account is to access a service on a managed computing device, identifying the password managed account for a lifecycle, and automatically managing the password managed account by updating and changing a password for the password managed account on a periodic basis.

17 Claims, 6 Drawing Sheets

(56) References Cited

U.S. PATENT DOCUMENTS

| | | | |
|---|---|---|---|
| 7,290,288 B2* | 10/2007 | Gregg et al. | 726/28 |
| 7,346,923 B2* | 3/2008 | Atkins et al. | 726/6 |
| 7,370,351 B1* | 5/2008 | Ramachandran et al. | 726/8 |
| 7,421,735 B2* | 9/2008 | Kerstens et al. | 726/12 |
| 7,430,590 B1* | 9/2008 | Rive | H04L 29/06 709/203 |
| 7,516,191 B2* | 4/2009 | Brouk | G06Q 10/06 709/217 |
| 7,596,703 B2* | 9/2009 | Kohiyama et al. | 713/193 |
| 7,788,399 B2* | 8/2010 | Brouk et al. | 709/238 |
| 7,793,342 B1* | 9/2010 | Ebrahimi | H04L 63/0281 713/166 |
| 8,141,140 B2* | 3/2012 | Wenzel | G06F 21/41 713/182 |
| 8,490,154 B2* | 7/2013 | Gomez et al. | 726/2 |
| 8,549,596 B2* | 10/2013 | Innes | 726/7 |
| 8,615,601 B2* | 12/2013 | Patrick et al. | 709/238 |
| 8,756,704 B2* | 6/2014 | Castellucci | G06F 21/6218 726/28 |
| 8,972,590 B2* | 3/2015 | Haghpassand | 709/223 |
| 2002/0049914 A1* | 4/2002 | Inoue et al. | 713/201 |
| 2002/0078365 A1* | 6/2002 | Burnett | H04L 9/00 713/193 |
| 2002/0095454 A1* | 7/2002 | Reed et al. | 709/201 |
| 2002/0116647 A1* | 8/2002 | Mont et al. | 713/201 |
| 2003/0005299 A1* | 1/2003 | Xia et al. | 713/171 |
| 2003/0105862 A1* | 6/2003 | Villavicencio | H04L 63/08 709/225 |
| 2003/0115484 A1* | 6/2003 | Moriconi et al. | 713/201 |
| 2003/0233544 A1* | 12/2003 | Erlingsson | 713/167 |
| 2005/0005094 A1* | 1/2005 | Jamieson et al. | 713/155 |
| 2006/0123472 A1* | 6/2006 | Schmidt | G06F 21/41 726/8 |
| 2006/0153380 A1* | 7/2006 | Gertner | 380/221 |
| 2006/0190736 A1* | 8/2006 | John | H04L 63/102 713/182 |
| 2007/0011460 A1* | 1/2007 | Brennan et al. | 713/182 |
| 2007/0078785 A1 | 4/2007 | Bush et al. | |
| 2007/0136603 A1* | 6/2007 | Kuecuekyan | G06F 21/6218 713/185 |
| 2007/0157292 A1* | 7/2007 | Danner et al. | 726/4 |
| 2007/0233883 A1* | 10/2007 | De Lutiis et al. | 709/229 |
| 2007/0245414 A1* | 10/2007 | Chan et al. | 726/12 |
| 2007/0250595 A1* | 10/2007 | Landfield | 709/218 |
| 2007/0256118 A1 | 11/2007 | Nomura et al. | |
| 2007/0271618 A1* | 11/2007 | Chao et al. | 726/27 |
| 2008/0016020 A1* | 1/2008 | Estes | 706/52 |
| 2008/0141024 A1* | 6/2008 | Ranganathan | 713/155 |
| 2008/0141333 A1* | 6/2008 | Chen et al. | 726/1 |
| 2009/0013406 A1* | 1/2009 | Cabuk et al. | 726/22 |

OTHER PUBLICATIONS

Coulouris G., et al, 'A security model for cooperative work', Technical Report 674, Oct. 1994, entire document, http://citeseerx.ist.psu.edu/viewdoc/download?doi=10.1.1.53.5710&rep=rep1&type=pdf.*

Hagimont, D., 'Protection in the Guide object-oriented distributed system', ECOOP 94, entire document, http://www.lirmm.fr/~ducour/Doc-objets/ECOOP/papers/0821/08210280.pdf.*

"A White Paper on Authentication and Access Management Issues in Cross-Organizational Use of Networked Information Resources", retrieved on Apr. 29, 2008 at <<http://www.cni.org/projects/authentication/authentication-wp.html>>, CNI, Coalition for Networked Information, Apr. 14, 1998, pp. 1-40.

"Authentication and Access Control", retrieved on Apr. 29, 2008 at <<http://it.med.miami.edu/x2232.xml>>, Miller School of Medicine, University of Miami, pp. 1-6.

Meier, et al, How to: Improve Security When Hosting Multiple Applications in ASP.NET 2.0 , retrieved Apr. 29, 2008 at <<http://msdn2.microsoft.com/en-us/library/aa480478(printer).aspx>>, CNI, Microsoft Corporation, Nov. 2005, pp. 1-9.

* cited by examiner

ISOLATION OF SERVICES OR PROCESSES USING CREDENTIAL MANAGED ACCOUNTS

TECHNICAL FIELD

The subject matter relates generally to protecting services, and more specifically, to provide a credential managed account for primary and trusted computing base services.

BACKGROUND

There are many services, such as Structured Query Language (SQL) and Microsoft Exchange®, operating on a local system or on a network service on Windows®. Typically, these services may authenticate to another computing device causing all of the services to authenticate as the computing device. This creates a problem that any distinction among the different services is lost over the wire. Thus, service-differentiation is difficult because the services do not have distinct identities over the wire.

Another problem is the administrators for SQL and Microsoft Exchange® struggle with security issues and management costs when deploying and configuring these services. The problem occurs when the administrators deploy these services with domain and local accounts and have to manually manage and change the passwords.

Although administrators have attempted to create a solution for managing the service password, there is room for improvement. It is desirable to find ways to protect services by managing passwords and improving security.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary systems, methods, and application programming interfaces for automatically creating and managing a credential managed account for primary services. The disclosure describes creating a new password managed account under a computing device organizational unit, defining the password managed account for the computing device, wherein the password managed account is to access a service on managed computing devices, identifying the password managed account for a lifecycle. Furthermore, this disclosure teaches automatically managing the password managed account by updating and changing a password for the password managed account on a periodic basis.

This automatic management of password improves the security and reduces the operation costs when deploying and configuring services. Furthermore, there is improved efficiency and convenience of primary services by creating a credential managed account for computing devices. Thus, security is improved and the user experience is enhanced.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

Many specific details of certain implementations of the subject matter are set forth in the following description and in FIGS. 1-6 to provide a thorough understanding of such implementations. One skilled in the art will understand, however, that the subject matter may have additional implementations, or that the subject matter may be practiced without several of the details described in the following description.

DETAILED DESCRIPTION

Overview

This disclosure is directed to primary and trusted computing base services, and is shown and described in the context of creating a credential managed account to improve security. This disclosure describes creating a new password managed account under a computing device organizational unit, and defining the password managed account for the computing device, wherein the password managed account is to access a service on managed computing devices. Furthermore, the disclosure describes identifying the password managed account for a lifecycle and automatically managing the password managed account by updating and changing a password for the password managed account on a periodic basis.

This disclosure describes isolating trusted computing base services from other low privilege services running on a Windows system. This disclosure describes isolation of Structured Query Language (SQL) and Exchange services from other non-Trusted Computing Base (TCB) services by introducing a new privilege that allows the trusted computing base service to impersonate standard users in order to remove these services from a trusted computing base. Benefits to the administrators are improved security, minimal management time, and reduced cost.

The creation of a credential managed account for primary services described herein are not limited to any particular application, but may be applied to many contexts and environments. By way of example and not limitation, the creation of a password managed account may be employed in Windows®, Windows Server System™, Windows Server® 2003, Windows Vista™, Windows Exchange Server™, Active Directory®, centralized computing services, and the like. For example, creating the password managed account allows automatic updating and changing the password.

Exemplary Services Environment

The following discussion of an exemplary operating environment provides the reader with assistance in understanding ways in which various subject matter aspects of the system, methods, and application programming interfaces may be employed. The environment described below constitutes but one example and is not intended to limit application of the subject matter to any one particular operating environment.

Figure 1:
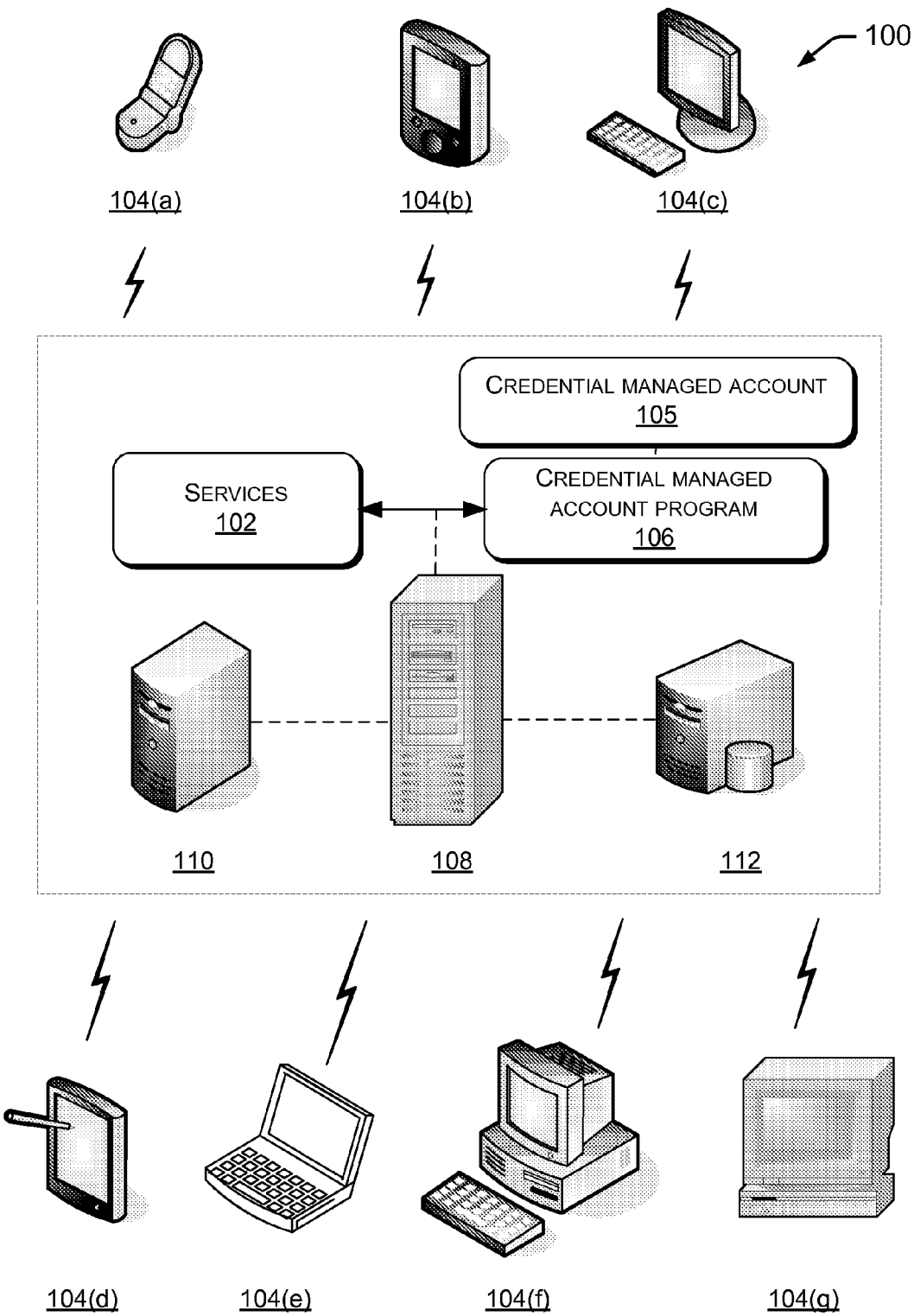
FIG. 1 is a block diagram of an exemplary service environment for creating a credential managed account.

FIG. 1 is an overview block diagram of an exemplary service environment 100 for providing services 102, such as primary services for Structured Query Language (SQL) and Exchange and Trusted Computing Base (TCB) services. Computing devices 104 enable the users to connect to a network to establish a remote terminal session or a network session. Computing device(s) 104 that are suitable for use, include but are not limited to, a cellular phone 104(a), a personal digital assistant 104(b), a personal computer 104(c), a writing tablet 104(d), a laptop computer 104(e), a desktop computer 104(f), a workstation 104(g), and the like. These various types of computing devices 104 in operation with the primary and TCB services 102 enable the user to conduct an activity, such as running applications, accessing files, managing databases, retrieving email, calendar, using network resources, sharing folders, and the like.

The environment 100 may provide a credential managed account 105 as, for example, but not limited to, a tool, a method, a solver, software, an application program, a service, technology resources which include access to the internet, and the like. Here, the credential managed account 105 is created by an exemplary application program, referred to as credential managed account application program 106.

This credential managed account application program 106 provides a password managed account to protect the primary services, SQL and Exchange. The term credential managed account is used interchangeably with password managed account. The credential managed account 105 is operational in a managed Active Directory® environment and in a downlevel Domain Controllers (DCs), such as Windows® Server 2003. Furthermore, the credential managed account application program 106 addresses Service Principal Name (SPN) issues associated with service accounts on Windows® 7 or higher DC's.

Here, the credential managed account application program 106 provides isolation of services by introducing a new privilege. The new privilege allows the service to impersonate standard users, in order to remove these services from the TCB and reduce the same. The impersonations based on service requirements include removing SeImpersonatePrivilege and impersonate at an identity level, use limited impersonation token to impersonate standard users, and reduce exposure of impersonation by reducing an open handle lifetime. Furthermore, administrators can not be impersonated and the token is filtered.

The isolation of services improves security by isolating services that hold user data, including but not limited to, social security numbers, credit card numbers, email accounts, and the like. Thus, the services from other non-Trusting Computing Base (TCB) services are isolated. This isolation occurs in an Active Directory® environment.

The credential managed account application program 106 in conjunction with the services 102 provide functionality to allow computing devices 104 to connect to a domain controller 108, a server 110, and a central directory database 112. The domain controller 108 manages security-related aspects between the users and domain interactions, centralizing security and administration. The server 110 provides physical and virtual resources. Implementations include but are not limited to, a server for load balancing, a server for managing the system, a server for database, a server for applications, and the like. The central directory database 112 provides stored information and may or may not be a separate component.

The user can log on at a terminal, and run applications, access data, databases, network resources, and the like through the primary services 102. Each log in or terminal session is independent. Advantages of using the credential managed account 105 include facilitate sharing of technologies, administering, managing and password account that is maintained or upgraded automatically every thirty days, and providing a complete graphical user interface including operating system desktop and support for a variety of input devices.

The credential managed account 105 is secure as domain accounts with good password strength, complexity, and recycle requirements. Policies are in place to control how frequently the passwords are recycled while using the same netlogon setting. The following is an example using the same netlogon setting: HKEY_LOCAL_MACHINE\SYSTEM\CurrentControlSet\Services\Netlogon\Parameters\MaximumPasswordAge.

A benefit is there is no additional cost for a service logon with the credential managed account 105. The logon cost is similar to a logon cost for a domain service account. Furthermore, there is minimal overhead on the system for managing these credential managed accounts 105.

There are measures for failure and recovery pertaining to the credential managed account 105. In one instance, if a computing device 104 is not able to connect to the DC 108 in the domain, the services should be able to complete a cached logon using the credential managed account 105.

In another instance, if the password is updated recently by the TCB component and the password is not replicated to all the DCs, then the TCB component should be able to do a logon with N−1 password against DCs which do not have the new password. This is similar to the N−1 password logon logic in netlogon today.

In another instance, if the password is out of sync with the password on the DCs, because of a system restore for example, the service administrator (with the necessary rights) should be able to reset the password with the new password and proceed with the logon. There is a command line tool (in addition to the API, for resetting the password on the domain controller and the local system). Note that this is an option in the existing sc.exe or a new tool. An administrator with the necessary permissions should be able to run this tool remotely.

In an implementation, there are many versions of Microsoft Windows™ operating systems run by a logical group of computers, known as a Windows Server® domain that share a central directory database. This central directory database, Active Directory® contains the user accounts and security information for resources in the Windows Server® domain. In this scenario, the credential managed account application program 106 sets up the credential managed account 105 with a password that is updated automatically and managed by Microsoft Windows®. The credential managed account application program 106 relies on changes in the Service Control Manager (SCM) in making the whole scenario occur. The specific changes required from SCM are to call logon user with special flags for the password managed account scenario. The Active Directory® administrator provides Object Identifiers (OIDs) for the new attributes that are stamped on these "Password managed accounts".

Exemplary Credential Managed Account Architecture

Figure 2:
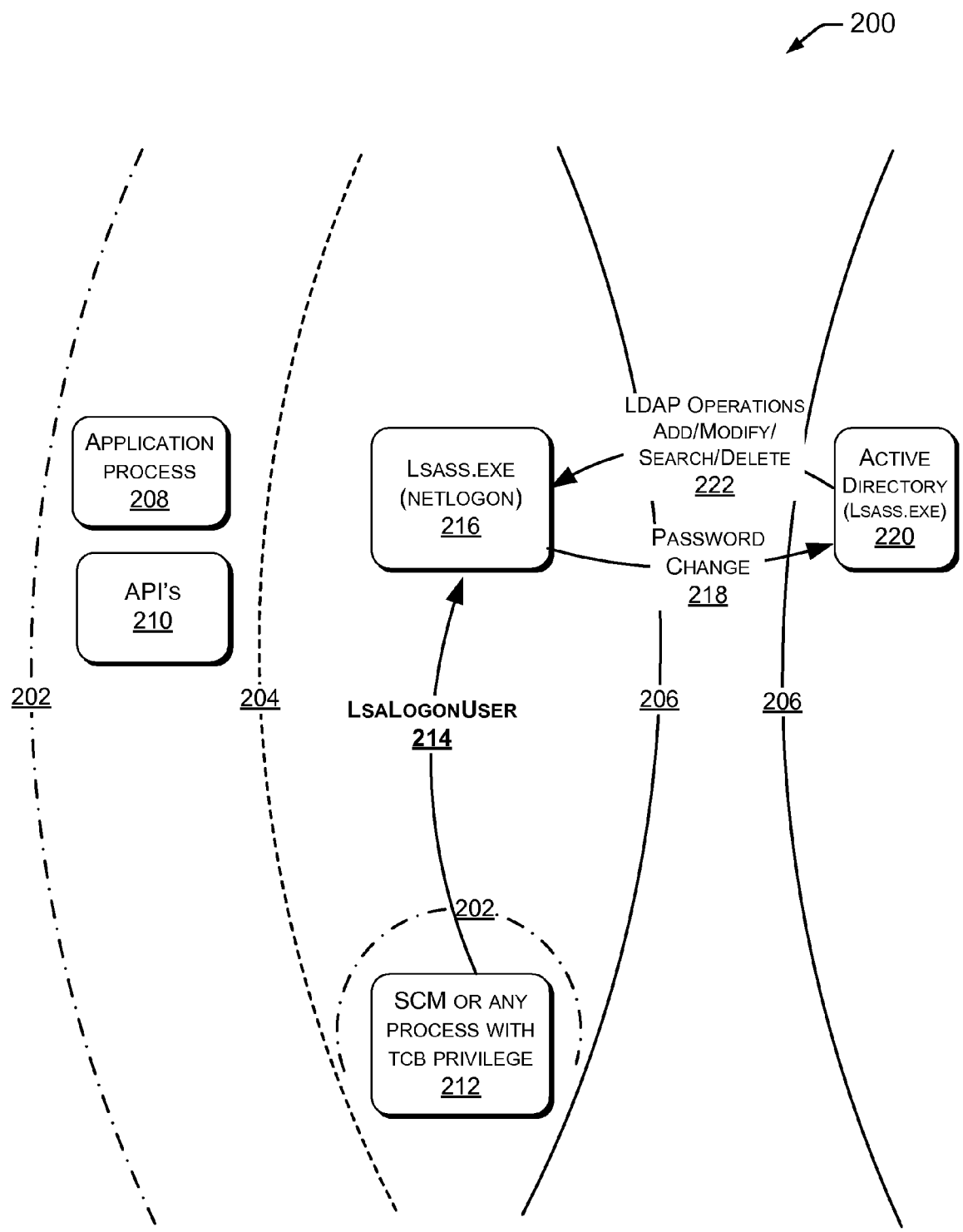
FIG. 2 is a block diagram of an exemplary architecture of a credential managed account according to one implementation.

Illustrated in FIG. 2 is an exemplary credential managed account architecture 200 configured for setting up a credential managed account 105 and to isolate services using sub-machine accounts. The architecture 200 illustrates three boundaries for creating the credential managed account 105, a process boundary 202, a computing device boundary 204, and a trust boundary 206.

Turning first to the components to create a credential managed account 105 in the process boundary 202 includes: an application process 208 and a set of public Application Programming Interfaces (APIs) 210 as shown on the left side of FIG. 2. The APIs 210 allow the application process 208 and/or administrators to create, update, delete, or overall manage the credential managed account 105. A more detailed discussion of the APIs 210 follows in FIG. 5.

Shown in the lower half of FIG. 2, the process boundary 202 also includes features such as windows Service Control Manager (SCM) or any process with a Trusted Computing Base (TCB) privilege 212. As previously mentioned, isolation of services occurs by introducing a new privilege. This new privilege allows the service to impersonate standard users, in order to remove these services from the TCB and reduce the same. The impersonations based on service requirements include removing SeImpersonatePrivilege and impersonate at an identity level, use limited impersonation token to impersonate standard users, and reduce exposure of impersonation by reducing an open handle lifetime. Furthermore, administrators cannot be impersonated or the token is filtered. There is improved efficiency and convenience of primary services by isolating services from low privileged services for users on computing devices.

Turning to a Local Security Authority (LSA) LogonUser 214 function, which is part of the computing device boundary 204. The credential for each credential managed account 105 is stored as LSA secret. The name of the secret has to be unique, as to not overlap with other secrets on the computing device and map uniquely to the account that it is created for. In an implementation, a name of the secret may be as follows: M$\{GUID\}.<NetBIOS account name>.

The LSA LogonUser 214 function is modified to accommodate for the credential managed account 105 logon. A contract is established between the callers and the LSA LogonUser 214 as follows:

The identity of the account is passed in the Username and Domain name parameters The Password parameter contains string composed as _SA_{<GUID>}, where GUID is a static GUID defined with value of 262e99c9-6160-4871-acec-4e61736b6f21.

The LSA side of the LogonUser 214 call checks the Password parameter and if set to the string described above, the LSA LogonUser 214 function will open the LSA secret storing the password for that account and use it to complete the logon. This is performed before dispatching the call to the authentication packages, to allow for transparency to the packages operation.

To support the Active Directory® environment with multiple Domain Controllers (DCs) reliably, new code is added to the LogonUser 214 call that will attempt to use the previous password for the account, if the logon with the current password failed with error, WRONG_PASSWORD. Next, the LSA LogonUser 214 interacts with Netlogon modifications 216, which is also in the computing device boundary 204.

The Netlogon modifications 216 may update the credentials on the credential managed account 105 periodically, such as every thirty days. In some implementations, the credentials may be managed on a periodic basis, based on environment needs, typically ranging from at least every fifteen days to at most every sixty days. The Netlogon modifications 216 are changed to accommodate this new feature by using a high-level algorithm. The high-level algorithm used includes:

On start, enumerate all credential managed accounts.
Create a timer that expires on the earliest required password change.
When timer is expired, establish a secure channel with the credential managed account identity and change the password.
If password change was successful, update the existing logon sessions for that account with the new password by calling LsaCallAuthenticationPackage with the MsV1_0ChangeCachedPassword message type.

As shown in the upper middle section of the diagram, the Netlogon modifications 216 illustrates how a password change 218 is relayed to an Active Directory® 220. Alternatively, these components may reside in multiple other types of environments.

In an implementation, the credential managed account is represented in the Active Directory® as a new object class—MSSEC-CredManagedAcct, which will derive from the "computer" class. The default state of the object on creation is:

accountexpires—never
userAccountControl—WORSTATION_TRUST_ACCOUNT.

Turning back to FIG. 2, the Active Directory® 220 notifies operational changes to a Lightweight Directory Access Protocol (LDAP) Operations 222, which stores account information and makes retrieval quick and easy. LDAP Operations 222 may add, modify, search, and/or delete passwords along with other account type information. LDAP Operations 222 relays any additions, modifications, searches, and/or deletions to the credential managed account 105 back to Netlogon modifications 216.

The architecture 200 includes an audit log to identify who has changed the password on these credential managed accounts. Thus, there are ways to view who can change the password on these accounts. For example, this information is available by looking at the Access Control List (ACL) on the object. The accounts are created under computing device accounts. The parent computing device account can be located anywhere in the Active Directory®.

While this implementation is shown in the Active Directory® environment, there are two modes of operation that organizations may deploy in the credential managed account. These two modes of operation include a locked down environment and a decentralized environment for lifecycle management reasons.

Figure 3:
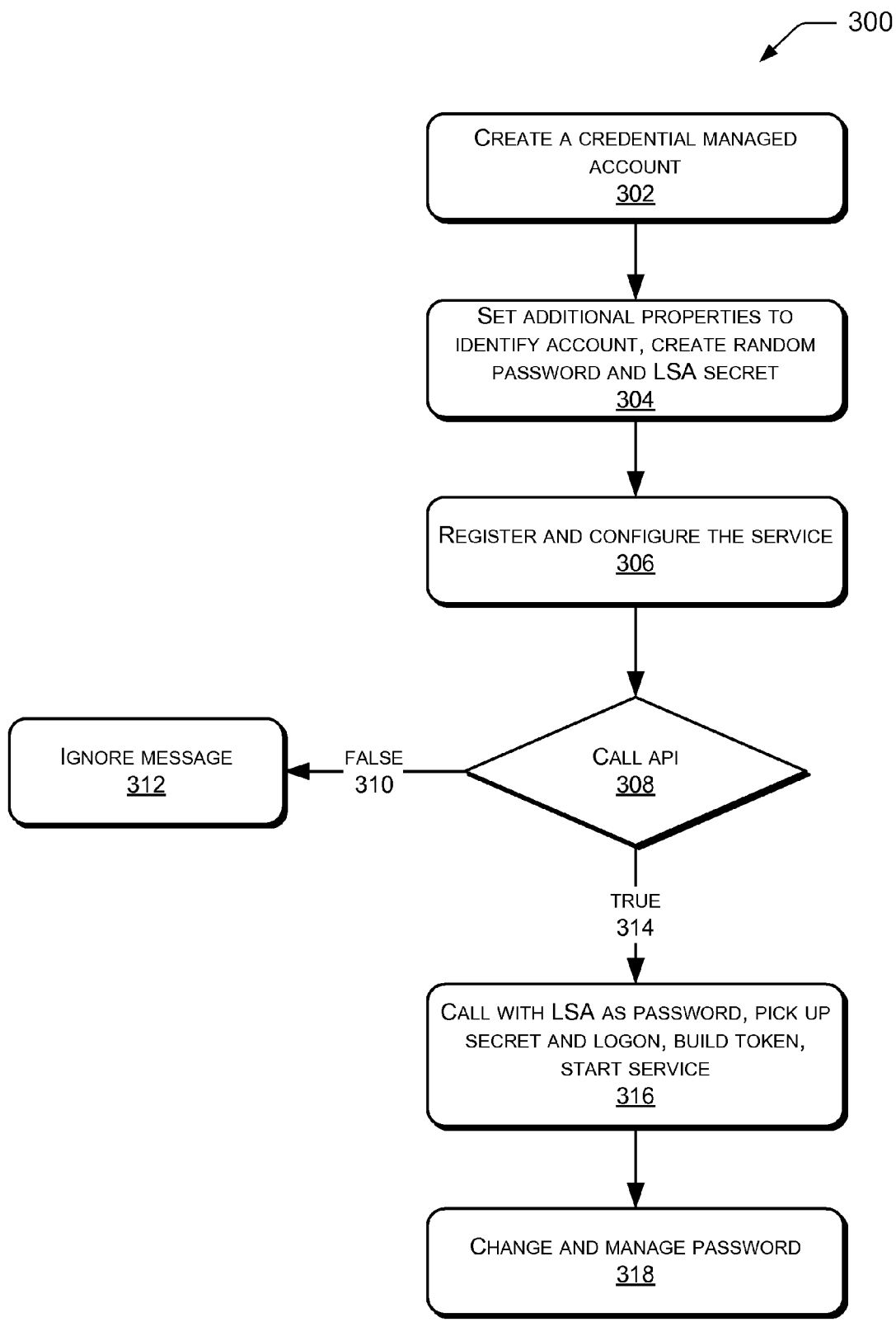
FIG. 3 is a block diagram of an exemplary process for a credential managed account in a locked down environment according to one implementation.
Figure 4:
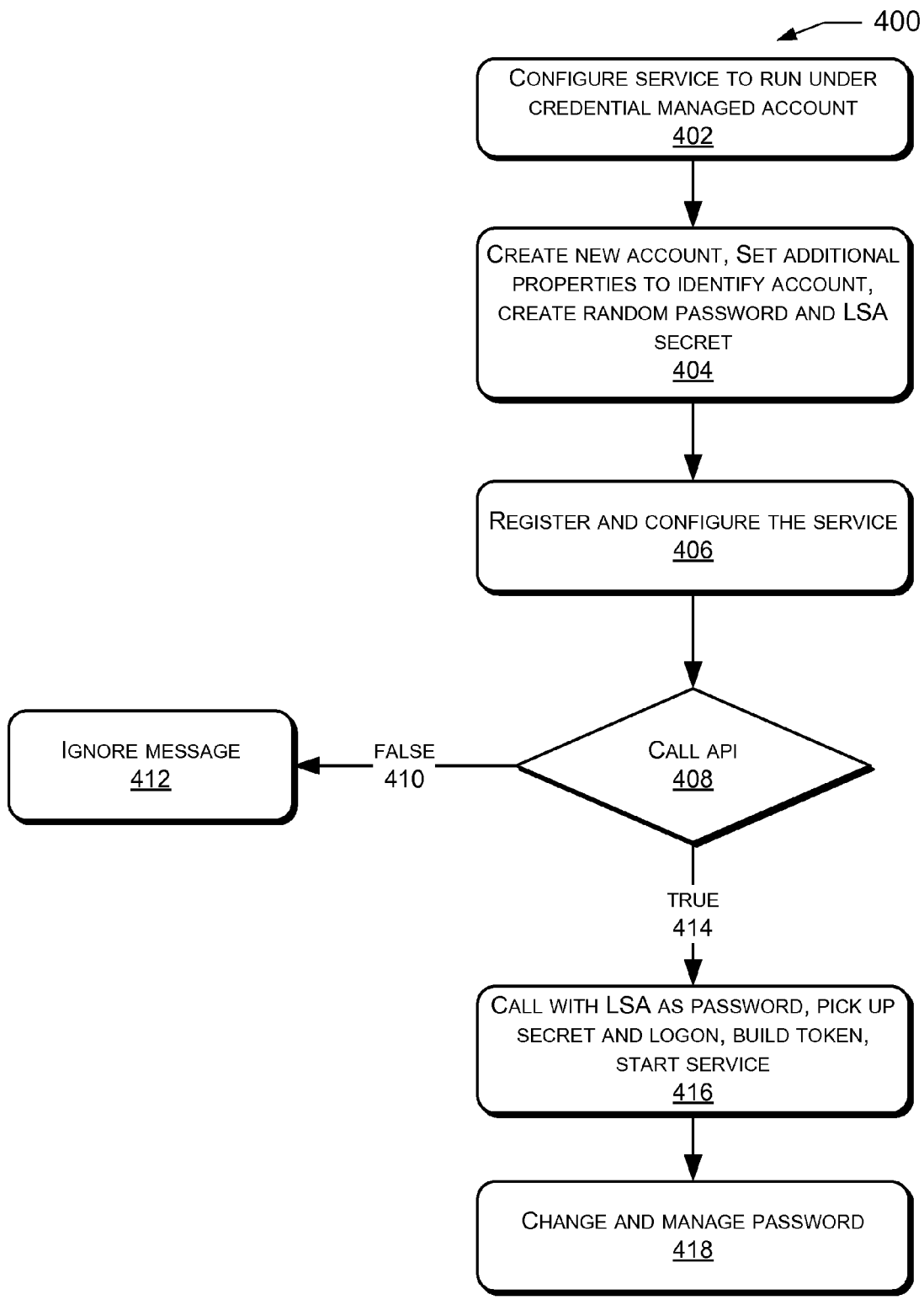
FIG. 4 is a block diagram of an exemplary process for a credential managed account in a decentralized environment according to one implementation.

FIGS. 3 and 4 illustrate exemplary manner of operations of environments for the architecture of FIG. 2. FIG. 3 illustrates an exemplary mode of operation in a locked down environment 300 and FIG. 4 illustrates an exemplary mode of operation in a decentralized environment 400.

Exemplary Lockdown Environment for Credential Managed Account

FIG. 3 is a block diagram of an exemplary process illustrating the mode of operation for a locked down environment 300 of FIG. 2. For ease of understanding, the method 300 is delineated as separate steps. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible that one or more of the provided steps may be omitted.

Traditionally, a locked down environment 300 limits a certain set of users or groups, including but not limited to Domain administrators, specialized accounts, and the like to create the credential managed account 302 Some versions allow the Domain administrators to create an account shell for the credential managed account 105 under the computing device and provide necessary access rights to a service administrator. The access rights may include but is not limited to, SetPassword, ValidatedWriteSPN, and the like.

The process for the locked down environment 300 includes service setup or management tools to call the new credential managed account APIs 210. Shown in block 304, the call is to set additional properties for identifying the credential managed account 105 created by the Domain administrator, creating a strong random password and setting the same in the Active Directory®, and creating a LSA secret (decorated) in a LSA store.

In block 306, the service setup or management tools registers the service with the SCM and configures the service to run under the credential managed account 105 in the service setup/management tools.

In block 308, the SCM will call NetIsServiceAccount, which is an API to query for the credential managed account 105. If the query indicates the account does not exist in a logon store, a return value is considered false or not true 310, the SCM will ignore the message 312. However, if the process flows such that the NetIserviceAccount indicates there is a credential managed account 105, then the query will return true 314, and the SCM will mark this service as using a credential managed account 105.

In block 316, the SCM calls LogonUser 214 with the decorated LSA secret as the password. LSA picks up the secret and logon to the credential managed account 105, builds the token and provides the same to the SCM. The SCM starts the service with the resulting token from the above handshake. In an exemplary implementation, this phase may range from at least fifteen to at most thirty seconds.

Shown in block 318 is where the TCB component in LSA automatically changes and manages the password for these accounts on a periodic basis. The automatic management may include configuring a Service Principal Name (SPN) or a host record for client access.

Exemplary Decentralized Environment for Credential Managed Account

FIG. 4 is a block diagram of an exemplary process illustrating the mode of operation for a decentralized environment 400 of FIG. 2. For ease of understanding, the method 400 is delineated as separate steps. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible that one or more of the provided steps may be omitted.

A decentralized environment 400 allows authenticated users and the like to create a credential managed account 105. For example, in block 402 a service administrator configures the service to run under the credential managed account 105.

The process for the decentralized environment 400 includes service setup or management tools to call a new credential managed account APIs 210. Shown in block 404, the call is to create the new credential managed account 105, if the account does not exist. The call in block 404 is also to set additional properties for identifying the credential managed account 105 created by the service administrator, to create a strong random password and to set the same in the Active Directory®, and to create a LSA secret (decorated) in a LSA store.

In block 406, the service setup or management tools registers the service with the SCM and configures the service to run under the credential managed account 105 in the service setup/management tools.

In block 408, the SCM calls NetIsServiceAccount, which is an API to query for the credential managed account 105. If the query indicates the account does not exist in a logon store, a return value is false or not true 410, the SCM will ignore the message 412. However, if the process flows such that the NetIsServiceAccount indicates there is a credential managed account 105, then the query will return true 414, and the SCM will mark this service as using a credential managed account 105.

In block 416, the SCM calls LogonUser with the decorated LSA secret as the password. LSA picks up the secret and logons to the credential managed account 105, builds the token and provides the same to the SCM. Next, the SCM starts the service with the resulting token from the above handshake. In an exemplary implementation, this phase may range from at least fifteen to at most thirty seconds.

Shown in block 418 is where the TCB component in LSA changes and manages the password for these accounts on a periodic basis. This periodic basis may range from at least fifteen days to at most sixty days. The automatic management may include configuring a Service Principal Name (SPN) or a host record for client access.

Exemplary API's for Credential Managed Account

Figure 5:
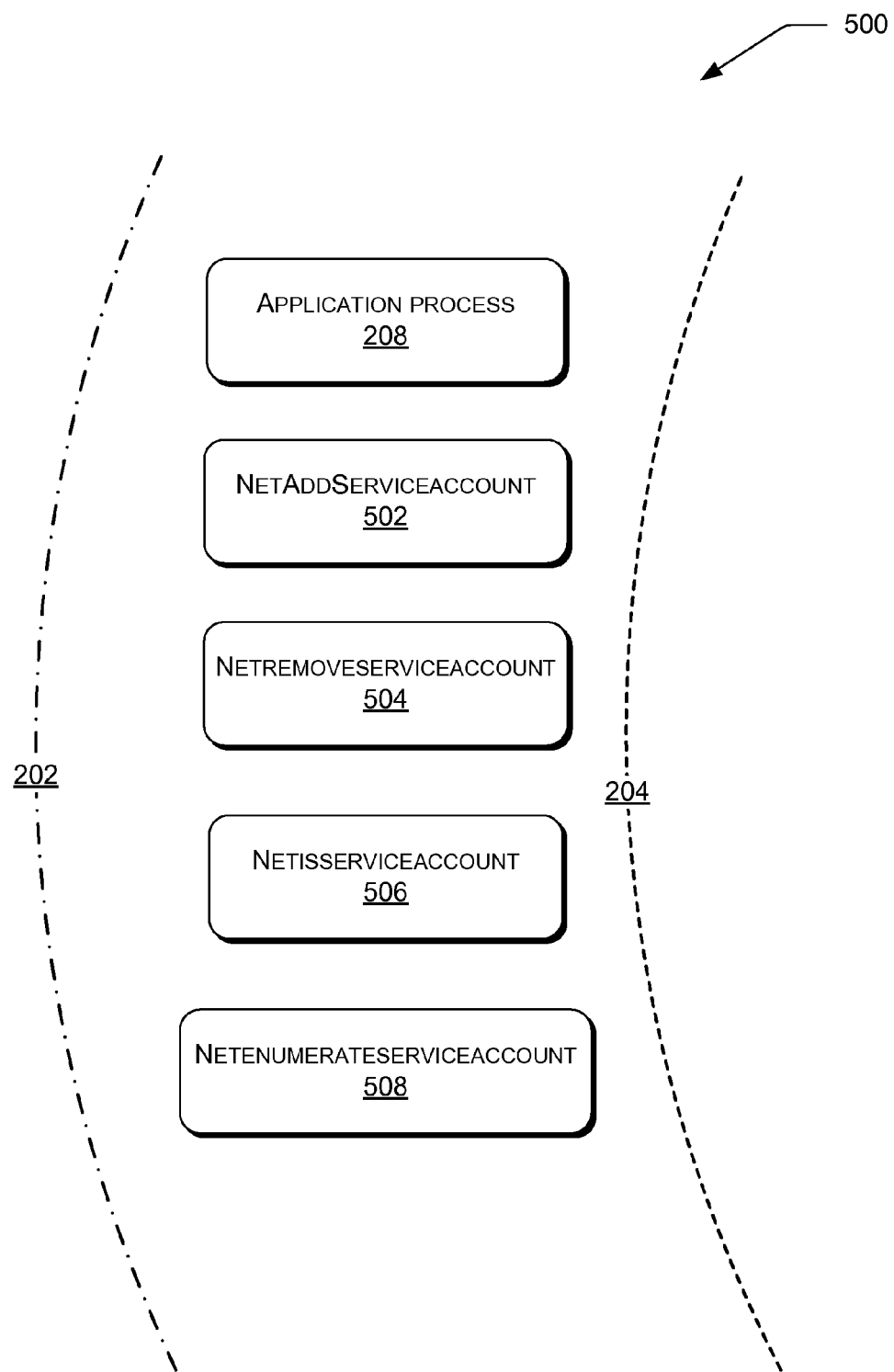
FIG. 5 is a block diagram of exemplary Application Programming Interfaces (APIs) for a credential managed account according to one implementation.

FIG. 5 illustrates exemplary APIs 500 that will available to the public and the behavior of the APIs. The APIs 500 may require that a caller is a member of a local administrator's group. Described in FIG. 5 are exemplary APIs 500 located between the process boundary 202 and the trust boundary 204.

Block 502 illustrates an API to create the credential managed account. In an implementation, the API is NetAddServiceAccount. The parameters may include:

Identity—SEC_WINNT_AUTH_IDENTITY structure describing the identity of the account to be created. Only SEC_WINNT_AUTH_IDENTITY_UNICODE will be supported.

The flags may include a DWORD that will contain flags passed to the API. Currently there are no values defined and MUST be 0.

The behavior of the API is if the account already exists in the Active Directory® and the RefCount on the account is 0 (which will be the case of a centralized environment where domain administrator precreates the account), then the account will be reset to a Default account state and a new password will be set. Otherwise (if RefCount is greater than 0), the RefCount will be incremented and no additional work will be done.

If the account does not exist in Active Directory®, the account will be created, initialized to the Default account and a new password will be set. In all cases, the RefCount will be incremented.

Block 504 illustrates an API to remove the credential managed account. If an application service administrator changes the service account from a Credential Managed Account 105 to a non Credential Managed Account and no other services on the system are using that Credential Managed Account 105, then in an implementation, RemoveCredentialManagedAccount should be called to do the following:

Clean up the properties in Active Directory for the machine account/sub-machine account; and Clean up the local state.

In another implementation, an API to remove the account is NetRemoveServiceAccount. The parameters may include:

Identity—SEC_WINNT_AUTH_IDENTITY structure describing the identity of the account to be deleted. Only SEC_WINNT_AUTH_IDENTITY_UNICODE will be supported.

Flags—a DWORD that will contain flags passed to the API. Currently there are no values defined and MUST be 0.

The behavior of the API is that the reference count on the account will be decremented. If the count is greater than 0, no additional work will be done. Otherwise, the account will be deleted from Active Directory®, the locally stored LSA secret will be deleted, as well as the state stored in the Netlogon registry store.

Block 506 illustrates an API to query for a credential managed account 105. In an implementation, the API to identify the credential managed account to query is NetIsServiceAccount. The parameters may include:

Identity—SEC_WINNT_AUTH_IDENTITY structure describing the identity of the account to be queried. Only SEC_WINNT_AUTH_IDENTITY_UNICODE will be supported.

Flags—a DWORD that will contain flags passed to the API. Currently there are no values defined and MUST be 0.

The behavior for this API is if the account specified exists in the Netlogon store, the return value will be true, otherwise it will be false.

Block 508 illustrates an API to identify the credential managed account on a computing device. In an implementation, the API to create enumerating service accounts is NetEnumerateServiceAccounts. The parameters may include:

Identities—an array of SEC_WINNT_AUTH_IDENTITY structures describing the identities of the credential managed accounts on the current machine. Only SEC_WNNT_AUTH_IDENTITY_UNICODE will be supported.

Flags—a DWORD that will contain flags passed to the API. Currently there are no values defined and MUST be 0.

The behavior of the API is to enumerate all the accounts in the Netlogon store and return an array of structures describing these accounts.

Exemplary Processing Functionality for a Credential Managed Account

Figure 6:
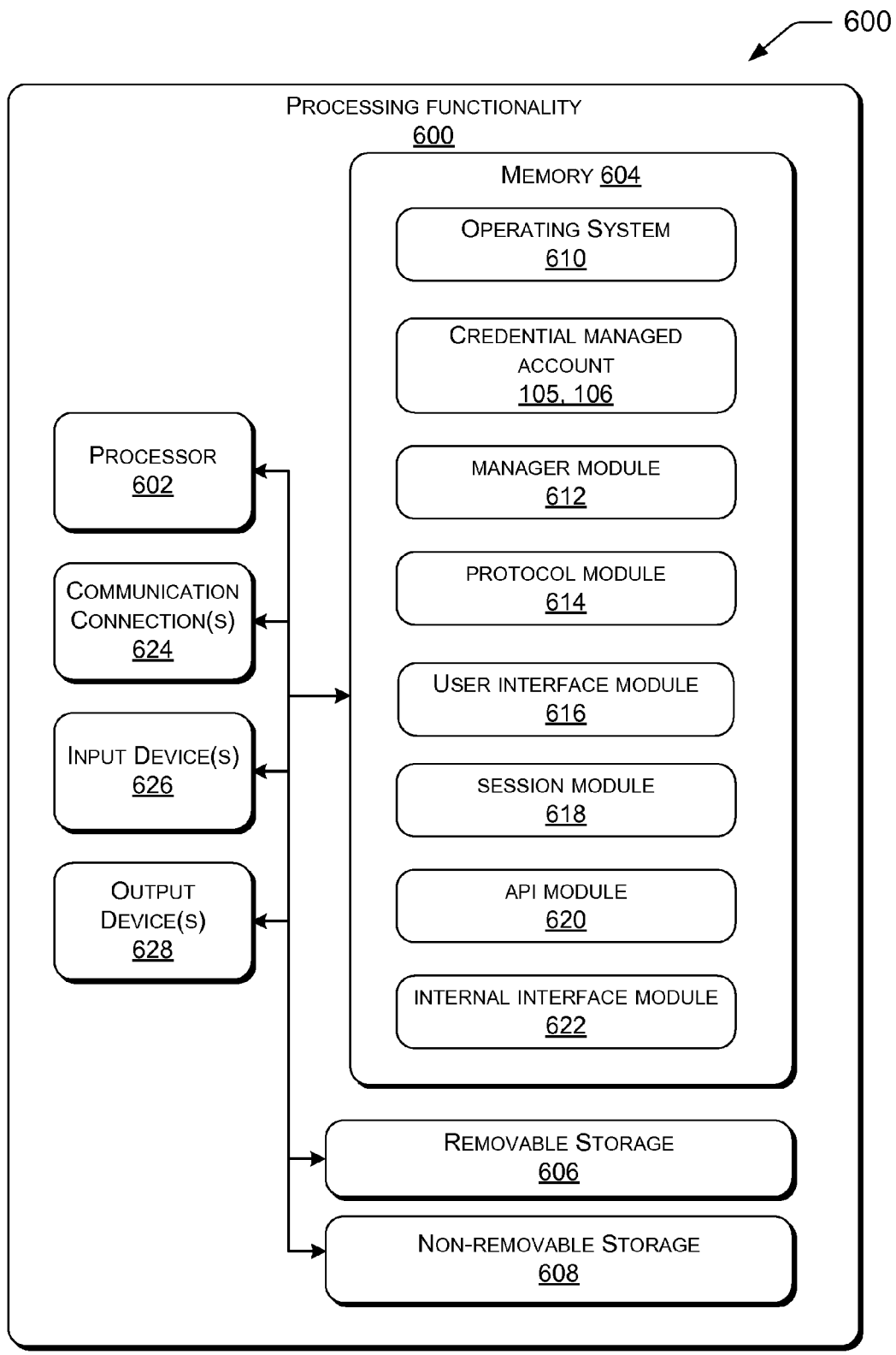
FIG. 6 is a schematic block diagram showing an exemplary system for the credential managed account according to one implementation.

FIG. 6 illustrates an exemplary processing functionality 600 to create a credential managed account. The processing functionality 600 may be configured as any suitable computing device or server capable of implementing a credential managed account. In one exemplary configuration, the processing functionality 600 comprises at least one processing unit 602 and memory 604. The processing unit 602 may be implemented as appropriate in hardware, software, firmware, or combinations thereof. Software or firmware implementations of the processing unit 602 may include computer- or machine-executable instructions written in any suitable programming language to perform the various functions described.

Memory 604 may store programs of instructions that are loadable and executable on the processor 602, as well as data generated during the execution of these programs. Depending on the configuration and type of computing device, memory 604 may be volatile (such as RAM) and/or non-volatile (such as ROM, flash memory, etc.). The terminal server 110(*a*) may also include additional removable storage 606 and/or non-removable storage 608 including, but not limited to, magnetic storage, optical disks, and/or tape storage. The disk drives and their associated computer-readable media may provide non-volatile storage of computer readable instructions, data structures, program modules, and other data for the computing devices.

Memory 604, removable storage 606, and non-removable storage 608 are all examples of computer storage media. Computer storage media includes volatile and non-volatile, removable and non-removable media implemented in any method or technology for storage of information such as computer readable instructions, data structures, program modules or other data. Memory 604, removable storage 606, and non-removable storage 608 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the terminal server 110(*a*) or other computing device.

Turning to the contents of the memory 604 in more detail, may include an operating system 610, one or more application programs or service for implementing the credential managed account program 106. In one implementation, the memory 604 includes a manager module 612 and a protocol management module 614. The manager module 612 includes but is not limited to identifying and tracking a session. The protocol management module 614 stores and manages storage of information, such as session identifier, session state, computing devices of the user, and the like, and may communicate with one or more local and/or remote databases or services.

The memory 604 further includes a user interface module 616 and a session module 618. The user interface module 616 presents the user with the user interface to log in or log off, in and out of a session, and the like. The session module 618 includes but is not limited to, tracking a state of the computing devices, logging in or logging off, connecting or disconnecting, and the like. The session module 618 performs connections, disconnections, search functions, such as performing searches to identify the client devices that are logged on, logged off, state of the client devices, the status of the user, and the like.

The memory 604 may include application programming interface (APIs) module 620 and an internal interface module 622. The APIs 620 help support requests for creating the credential managed account, removing the credential managed account, identifying the account to be queried, an enumerating the account made by the credential managed account application program 106.

The processing functionality 600 may also contain communications connection(s) 624 that allow the processing functionality 600 to communicate with a stored database, another computing device or server, the user terminals, and/or other devices on the network. Communications connection(s) 624 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 600 may also include input device(s) 626 such as a keyboard, mouse, pen, voice input device, touch input device, etc., and output device(s) 628, such as a display, speakers, printer, etc. The processing functionality 600 may include a database hosted on the processing functionality 600 including, but is not limited to, session data, network addresses, list of computing devices 104, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for creating a credential managed account, implemented at least in part by a processor of a computing device, the method comprising:
   creating, by the processor, a new password managed account under a computing device organizational unit;
   defining, by the processor, the new password managed account to access a low privilege service on a managed computing device, the low privilege service having limited privileges;
   identifying, by the processor, the new password managed account for a lifecycle;
   providing, by the processor, a new privilege that allows the low privilege service to impersonate a context of a non-administrator user;
   isolating, by the processor, the low privilege service from a trusted computing base, wherein isolating the low privilege service includes removing a trusted computing base privilege associated with the low privilege service;
   impersonating a context of the non-administrator user, by a process associated with the low privilege service, at an identity level by using a limited impersonation token subsequent to the removal of the trusted computing base privilege;
   creating a random password for the new password managed account;
   storing the random password in a central directory database;
   creating a local security authority secret for the random password;
   automatically updating, by the processor, the new password managed account by changing the random password for the new password managed account on a periodic basis; and
   registering the low privilege service with a service control manager and configuring the low privilege service to operate under the new password managed account.

2. The method of claim 1, wherein identifying the new password managed account for the lifecycle comprises identifying the new password managed account for the lifecycle in a locked down environment or a decentralized environment.

3. The method of claim 1, wherein the new password managed account is configured to operate on the computing device or a remote computing device in a domain environment.

4. The method of claim 1, further comprising configuring a Service Principal Name (SPN) or a host record for client access on a periodic basis of thirty days.

5. The method of claim 1, further comprising calling, by the service control manager, a log on function using the local security authority secret as a loci on password to log on to the new password managed account.

6. The method of claim 5, further comprising determining the local security authority secret, logging on to the new password managed account, and building the limited impersonation token.

7. The method of claim 6, further comprising starting the low privilege service with the limited impersonation token from a handshake.

8. The method of claim 1, wherein the defining the new password managed account for the computing device further comprises providing another new privilege that allows the low privilege service to impersonate standard users to provide an isolation for services.

9. A system comprising:
   a processor;
   a memory coupled to the processor, wherein instructions stored in the memory program the processor to:
      define a password managed account, wherein the password managed account is created for a lifecycle to access a low privilege service on a managed computing device;
      remove the low privilege service from a trusted computing base, wherein removing the low privilege service includes removing a trusted computing base privilege associated with the low privilege service;
      identify the password managed account for a lifecycle;
      provide a new privilege that allows the low privilege service to impersonate a context of a non-administrator user subsequent to the removal of the trusted computing base privilege;
      create a random password for the password managed account;
      store the random password in a central directory database;
      create a local security authority secret for the random password;
      register the low privilege service with a service control manager and configure the low privilege service to operate under the password managed account;
      impersonate a context of the non-administrator user, by a process associated with the low privilege service, at an identity level by using a limited impersonation token subsequent to the removal of the trusted computing base privilege; and
      automatically update the password managed account by changing a password for the password managed account on a periodic basis.

10. The system of claim 9, further comprising configuring a Service Principal Name (SPN) or a host record for client access.

11. The system of claim 9, wherein the instructions stored in the memory further program the processor to provide access rights to a computer object that hosts one or more services.

12. The system of claim 9, wherein identifying the password managed account for a lifecycle further includes identifying the password managed account for the lifecycle in a locked down environment or a decentralized environment.

13. The system of claim 9, wherein the defining the password managed account for the computing device comprises providing another new privilege that allows the low privilege service to impersonate standard users to provide an isolation for services.

14. The system of claim 9, wherein the instructions stored in the memory further program the processor to provide an isolation for the low privilege service from the trusted computing base by using sub-machine accounts.

15. A computing device comprising:
one or more processors; and
a memory storing computer-readable instructions that, when executed by the one or more processors, cause the one or more processors to:
create a credential managed account to access services on the computing device, wherein creating the credential managed account includes:
storing, in the memory, an account name;
creating a random password;
storing the random password in a central directory database;
creating a local security authority secret for the random password; and
removing a low privilege service from a trusted computing base, wherein removing the low privilege service includes removing a trusted computing base privilege associated with the low privilege service;
provide a new privilege that allows the low privilege service to impersonate a context of a non-administrator user;
identify the credential managed account for a lifecycle;
impersonate the context of the non-administrator user, by a process associated with the low privilege service, at an identity level by using a limited impersonation token subsequent to the removal of the trusted computing base privilege;
register the low privilege service with a service control manager and configure the low privilege service to execute under the credential managed account subsequent to the removal of the trusted computing base privilege;
automatically update the credential managed account by changing the random password for the credential managed account on a periodic basis; and
call, by the service control manager, a log on function using the local security authority secret as a loci on password.

16. The computing device of claim 15, further comprising instructions to cause the one or more processors to isolate trusted computing services from other low privilege services by allowing the trusted computing services to impersonate users of the low privilege services.

17. The computing device of claim 15, further comprising instructions to cause the one or more processors to:
retrieve the random password on the credential managed account, and
build a token from a handshake.

* * * * *